United States Patent [19]

Shiozaki et al.

[11] Patent Number: 4,785,688
[45] Date of Patent: Nov. 22, 1988

[54] TORQUE LIMITER FOR PAPER FEEDING DEVICE OF OFFICE MACHINE AND THE LIKE

[75] Inventors: Takeshi Shiozaki, Kasugai; Atsuo Takeuchi, Nagoya, both of Japan

[73] Assignee: Nippo Sangyo Kabushiki Kaisha Co Ltd, Japan

[21] Appl. No.: 30,500

[22] Filed: Mar. 27, 1987

[30] Foreign Application Priority Data

Aug. 15, 1986 [JP] Japan .................. 61-191909

[51] Int. Cl.⁴ .............................. F16H 1/44; F16H 1/42
[52] U.S. Cl. ................................ 74/710.5; 74/714; 192/84 PM
[58] Field of Search ................ 74/710.5, 714; 192/84 PM

[56] References Cited

U.S. PATENT DOCUMENTS

| 3,974,884 | 8/1976 | Gidlund | 192/84 PM X |
| 4,115,040 | 9/1978 | Knorr | 192/84 PM X |
| 4,120,618 | 10/1978 | Klaus | 192/84 PM X |
| 4,152,099 | 5/1979 | Bingler | 192/84 PM X |
| 4,210,229 | 1/1980 | Rees | 74/710.5 X |

FOREIGN PATENT DOCUMENTS 459638 5/1928 Fed. Rep. of Germany ..... 74/710.5

*Primary Examiner*—Dirk Wright
*Attorney, Agent, or Firm*—Fred Philpitt

[57] ABSTRACT

A torque limiter for an office machine includes a planetary differential. Its sun and ring gear are limited in their degree of rotational speed difference by a hysterisis magnetic coupling. The hysterisis coupling is formed as two concentric cylinders with space between them. Selected portions of the hysterisis coupling may be magnetized to alter the coupling's characteristics.

3 Claims, 3 Drawing Sheets

TORQUE LIMITER FOR PAPER FEEDING DEVICE OF OFFICE MACHINE AND THE LIKE

DETAILED DESCRIPTION OF THE INVENTION

1. Field of the Invention

The present invention relates to a torque limiter for a paper feeding device of an office machine and the like which is employed in a portion for transmitting a relatively small torque, such as a paper feeding mechanism and the like of office machines, including mainly facsimile equipment, electronic copying machines, printers of word processors and computers.

2. Prior Art

Conventionally, as torque limiters used in this type of paper feeding devices of office machines, there are many which employ a so-called spring clutch in which a coil spring is interposed between an input shaft and an output shaft, and, when a torque of reverse rotation larger than a rotational torque input from the input shaft is applied to the output shaft side, the torque input from the input shaft is not transmitted to the output shaft, while, when the torque of reverse rotation applied to the output shaft side becomes smaller than the rotational torque input from the input shaft, the rotational torque input from the input shaft is transmited to the output shaft.

Problems to Be Solved by the Invention

In recent years, owing to the widespread use of office machines, including facsimile equipment and electronic copying machines, demand for torque limiters used in paper feeding devices of such office machines has increased sharply. Naturally, there has been demand for low-cost and highly reliable products in respect of such torque limiters.

However, with torque limiters using spring clutches, such as described above, variations in torque are liable to occur due to any slight differences in dimensional accuracy and the effect of humidity in the light of their structures, so that such torque limiters have lacked reliability in their operation.

To cope with these drawbacks, by taking note of a metallic plate having hysteresis characteristics, i.e., a hysteresis plate, the present applicant proposed a torque limiter in Japanese Utility Model Application No. 76840/1985 which employs the hysteresis plate an a magnetic material and is so arranged to combine the same with a planetary gear mechanism. That invention is such that a rotational center must be determined accurately in its planetary gear supporting structure, and a substantially high degree of dimensional accuracy is required of the supporting member of the planetary gear, so that the production cost of parts is high.

In addition, with a torque limiter of this type, its set torque must be changed in accordance with a multiplicity of usages. To cope with this requirement, various types of hysteresis plates, magnetic materials, casings, etc. are managed as compnent parts, and products having desired set torques which are required by users are supplied. Consequently, the production and management of these various types of component parts are extremely troublesome.

Means for Overcoming the Problems

To this end, the present invention provides a torque limiter for a paper feeding device of an office machine or the like, characterized in that a support member 2 of a planetary gear 3 is fixed to and supported by a rotational shaft 1, three or more needle roller 4 are rotatably supported by the support member 2 in such a manner that portions of peripheral side surface thereof are exposed, one or more of the planetary gears 3 are rotatably supported by the needle roller 4, a cylindrical member 5 is rotatably supported by the rotational shaft 1, a sun gear 6 engaging with the planetary gear 3 is provided on one side of the cylindrical member 5, a side plate member 7 is rotatably supported by the rotational shaft 1 such as to be adjacent to the cylindrical member 5, a cylindrical casing 8 is secured to the side plate member 7, an internal gear 9 engaging with the planetary gear 3 is provided on the inner side of the casing 8, a magnetized magnetic material 11 or a hysteresis plate 10 is installed on an outer peripheral side surface portion of the cylindrical member 5, the hysteresis plate 10 or the magnetized magnetic material 11 is installed on the inner side of the casing 8, and arbitrary portions of the magnetic material 11 are magnetized.

EMBODIMENT

Figure 1:
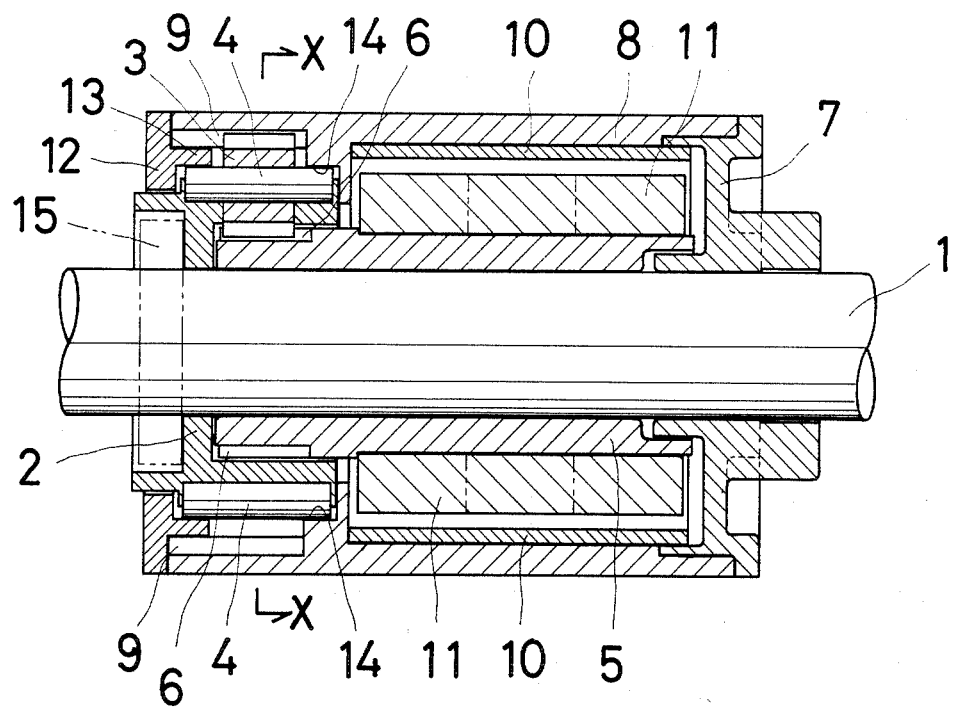
FIG. 1 is a vertical cross-sectional view of an embodiment in accordance with the present invention.
Figure 2:
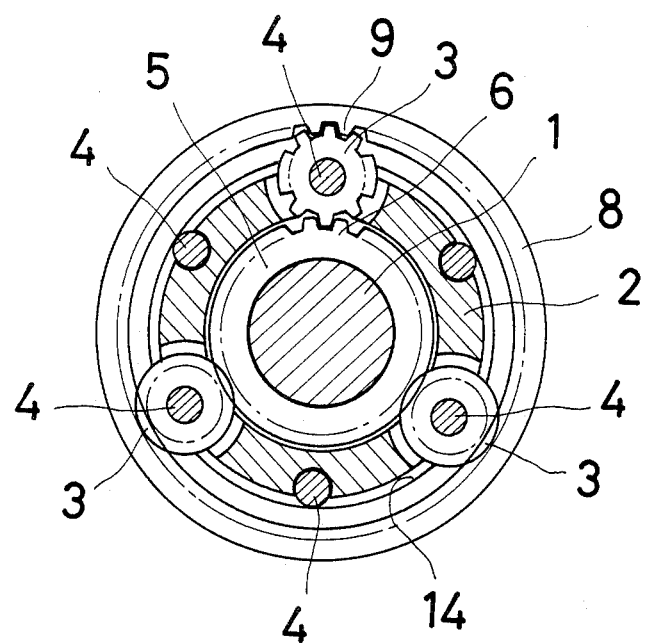
FIG. 2 is a cross-sectional view taken along the line X—X in FIG. 1.

An embodiment of the present invention will now be described with reference to the accompanying drawings of FIGS. 1 and 2. Reference numeral 1 denotes a rotational axis, to which a supporting member 2 of a planetary gear 3 is secured to and supported by a through pin 15. Six needles 4 are rotatably supported by the support member 2 such as to expose parts of peripheral side surfaces thereof. The planetary gear 3 is rotatably supported by three needles 4 among the needles 4. Reference numeral 5 denotes a cylindrical member which is rotatably supported by the rotational shaft 1 such as to be adjacent to the right-hand side of the support member 2 and forms at one side portion of the cylindrical member 5 a sun gear 6 engaging with the planetary gear 3. Reference numeral 7 denotes a side plate member rotatably supported by the rotary axis 1 such as to be adjacent to the right-hand side of the cylindrical member 5. A cylindrical casing 8 is secured to the left-hand side of the side plate member 7. An annular stepped portion 14 against which the exposed right-hand end portions of the needle roller 4 abut is formed on the slightly left-hand side of the center of the inner peripheral portion of the casing 8. An internal gear 9 engaging with the planetary gear is formed on the left-hand side of the annular stepped portion 14. Reference numeral 10 denotes a cylindrically formed hysteresis plate and is installed on the right-hand side of the annular stepped portion 14 such as to move integrally with the casing. Reference numeral 11 denotes a magnetized magnetic material which is fixed on an outer peripheral surface portion of the cylindrical member 5 and is in such a positional relationship with the hysteresis plate 10 that its outer peripheral surface corresponds with the inner peripheral surface of the hysteresis plate 10. As for the magnetic material 11, it is possible to use one whose entire portion is magnetized, but it is possible to meet various needs by using one which is partially magnetized in accordance with desired torques. Reference numeral 12 denotes a cover, at the rear surface of which is formed an annular protrusion 13 against which the exposed left-hand end portions of the needle roller 4 abut. In other words, by causing the needle roller 4 to abut against the annular stepped portion 14 formed on the inner peripheral surface portion of the casing 8 and the annular protrusion 13 formed on the rear surface of the cover 12, an automatic centering function like that of needle bearings is demonstrated when the support member 2 of the planetary gear 3 rotates.

Figure 3:
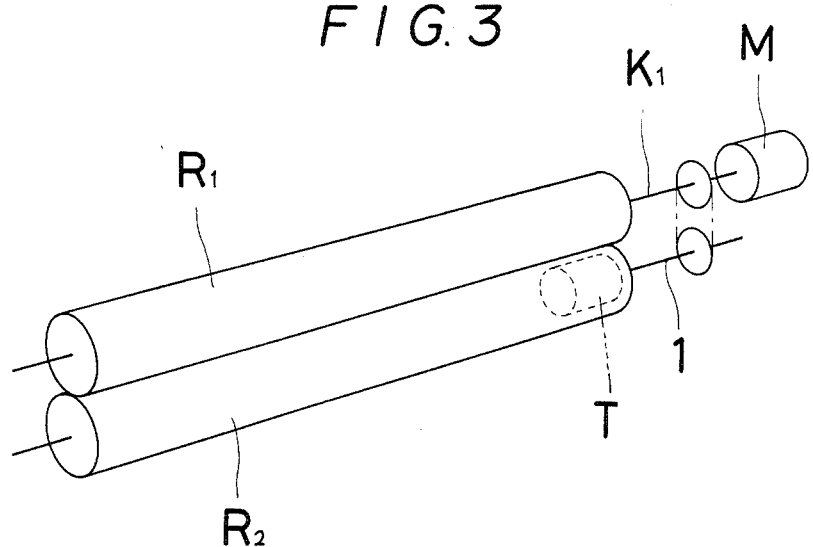
FIG. 3 is a perspective view of an outline of an example of the invention in application.
Figure 5:
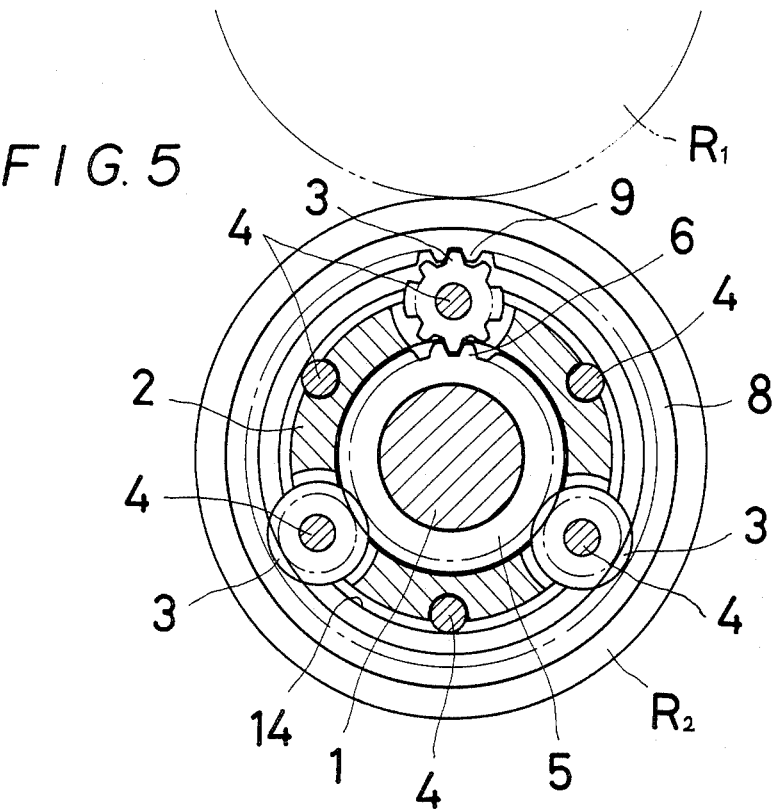
FIG. 5 is a cross-sectional view of essential portions of the example of the invention in application.
Figure 4A:
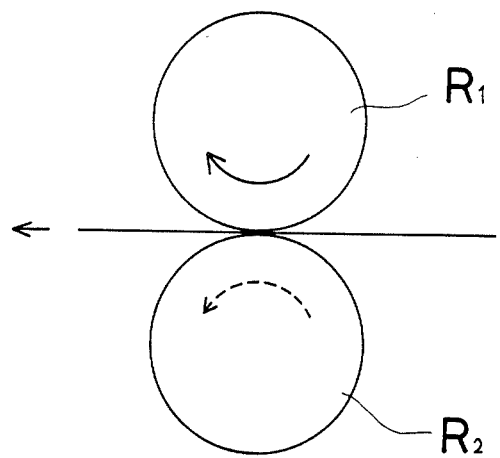
FIGS. 4(A) and 4(B) are diagrams illustrating the state of paper feeding.
Figure 4B:
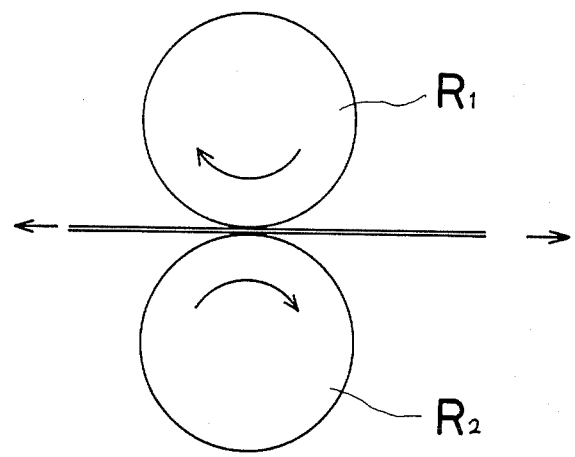

Referring to FIGS. 3 to 5, description will be made of an example of application in a case where a torque limiter in accordance with the present invention is used in a paper feeding device of an electronic copying machine. Reference characters $R_1$ and $R_2$ denote rubber rollers, which are disposed such as to be abut against each other. Of these rubber rollers, the upper rubber rollers $R_1$ is directly coupled with a drive shaft $K_1$ of a drive motor M. Meanwhile, the lower rubber roller $R_2$ is coupled with the casing 8 of the main body of the torque limiter T such as to move integrally therewith. A sprocket or a pulley is supported by the drive shaft $K_1$ and the rotational shaft 1 fixing and supporting the support member 2 of the torque limiter T, respectively. A chain or belt is trained between the sprockets or pulleys so as to transmit the rotational torque of the drive shaft $K_1$ to the rotational shaft 1.

When a sheet of paper is fed properly to the paper feeding device, the rotational torque of the drive shaft $K_1$ is transmitted to the upper rubber roller $R_1$ and the rotational shaft 1. At that time, however, since the lower rubber roller $R_2$ is held in pressure contact with the upper rubber roller $R_1$ via the sheet of paper, the frictional rotational torque thereof becomes greater than the rotational torque transmitted from the rotational shaft 1 via the torque limiter T, so that the lower rubber roller $R_2$ rotates in the reverse direction of the rotation of the rotational shaft 1. In the event that two or more sheets of paper are fed, the sheets undergo slippage with respect to each other, with the result that the frictional rotational torque fails to be transmitted from the upper rubber roller $R_1$ to the lower rubber roller $R_2$. Consequently, the rotational torque of the rotational shaft 1 is transmitted to the lower rubber roller $R_2$ via the torque limiter T, and the lower rubber roller $R_2$ rotates in the same direction so that of the rotational shaft 1, thereby discharging unnecessary sheets of paper.

Description will be made of the operation of the internals of the torque limiter T. First, in a case where the upper and lower rubber rollers $R_1$, $R_2$ are in the state of pressure contact, i.e., they are properly feeding a sheet of paper, the rotational shaft 1 rotates in the same direction as that of the upper rubber roller $R_1$, and the support member 2 of the planetary gear 3 fixed to and supported by the rotational shaft 1 also rotates in the same direction. Correspondingly, the planetary gear 3 and the needles 4 also revolve in the same direction. At that time, the lower rubber roller $R_2$ rotates in the opposite direction of the rotational shaft 1 due to frictional torque occuring in relation to the upper rubber roller $R_1$, and the casing 8 moving integrally with the lower rubber roller $R_2$ and the internal gear 9 formed on the inner peripheral surface thereof also rotate in the reverse direction. The turning direction of the planetary gear 3 becomes opposite to the rotating direction of the rotational shaft 1 in conjunction with the rotation of this internal gear 9, so that the cylindrical member 5 in which the sun gear 6 engaging with the planetary gear 3 is formed rotates in the same direction as that of the rotational shaft 1.

On the other hand, in a case where two or more sheets are fed, the rotational shaft 1 rotates in the same direction as that of the upper rubber roller $R_1$, and the support member 2 of the planetary gear 3 fixed to and supported by the rotational shaft 1 also rotates in the same direction, with the result that the planetary gear 3 and the needle roller 4 also revolve correspondingly in the same direction.

At that time, since frictional rotational torque is not transmitted from the upper rubber roller $R_1$ to the lower rubber roller $R_2$, the lower rubber roller $R_2$ rotates in the same direction as that of the rotational shaft 1 due to a suction force occurring between the magnetic material 11 installed in the cylindrical member 5 and the hysteresis plate 10 installed on the inner peripheral surface of the casing 8.

Effect of the Invention

The present invention is characterized in that there is provided a torque limiter for a paper feeding device of an office machine or the like, wherein a support member 2 of a planetary gear 3 is fixed to and supported by a rotational shaft 1, three or more needle roller 4 are rotatably supported by the support member 2 in such a manner that portions of peripheral side surfaces thereof are exposed, one or more of the planetary gears 3 are rotatably supported by the needle roller 4, a cylindrical member 5 is rotatably supported by the rotational shaft 1, a sun gear 6 engaging with the planetary gear 3 is provided on one side of the cylindrical member 5, a side plate member 7 is rotatably supported by the rotational shaft 1 such as to be adjacent to the cylindrical member 5, a cylindrical casing 8 is secured to the side plate member 7, an internal gear 9 enaging with the planetary gear 3 is provided on the inner side of the casing 8, a magnetized magnetic material 11 or a hysteresis plate 10 is installed on an outer peripheral side surface portion of the cylindrical member 5, and the hysteresis plate 10 or the magnetized material 11 are magnetized. Therefore, by causing the needle roller 4 to abut against the annular stepped portion 14 formed on the inner peripheral surface portion of the casing 8 and the annular protrusion 13 formed on the rear surface of the cover 12, an automatic centering function like that of needle bearings can be demonstrated in a case where the supporting member 2 of the planetary gear 3 rotates. Thus it becomes unnecessary for a high degree of dimensional accuracy to be required of the support member 2 of the planetary gear in the planetary gear supporting structure, thereby making it possible to reduce the manufacturing costs of parts to a low level. In addition, since arbitrary portions of the magnetic material 11 are magnetized, it is possible to cope with changes in the set torque with an identical component part, so that it becomes unnecessary to produce and manage various types of hysteresis plates, magnetic materials, casings and the like as component parts, thereby making it possible to reduce the production and management costs of component parts to a low level. Thus, the present invention is an outstanding invention which demonstrates various effects.

We claim:

1. A torque limiter for an office machine paper feeder comprising
   (a) a cylindrical casing (8) having an inner inwardly- and radially-directed annular support surface (14),
   (b) a circular lid member (12) connected to said casing (8) and having an inner annular projection (13),
   (c) a central rotary shaft (1) extending through said casing (8),
   (d) a substantially-annular support member (2) fixedly mounted on said shaft (1),
   (e) at least three needle rollers (4) rotatably supported in recesses provided in the outer circumference of said support member (2), said rollers (4) extending coaxially with said shaft (1) and being exposed to the outside of said support member (2) at their circumferences,
   (f) each said roller (4) being in contact with an inwardly and radially-directed support surface of said inner annular projection (13) of said lid member (12) and said inwardly- and radially-directed annular support surface (14) of said casing (8) at the circumferences of opposed end portions of said roller (4),
   (g) a planetary gear (3) supported on and around at least one of said rollers (4), said gear (3) being rotatably relative to the roller (4),
   (h) a hollow cylindrical member (5) supported on and around said shaft (1), said member (5) being rotatable relatively to said shaft (1),
   (i) one end portion of said cylindrical member (5) being formed of a sun gear (6) which engages said planetary gear (3),
   (j) a side plate member (7) supported on and around said shaft (1), said member (7) being adjacent to the other end portion of said cylindrical member (5) and being rotatable relatively to said shaft (1),
   (k) said side plate member (7) being connected to said casing (8),
   (l) an integral gear (9) formed in the inner surface of said casing 8 and engaging said planetary gear (3),
   (m) a cylindrical member (11) connected to the outer circumference of said cylindrical member (5),
   (n) a cylindrical member (1) connected to the inner circumference of said casing (8) and surrounding said cylindrical member (11), and
   (o) said cylindrical members (11) and (1) constituting a means for transmitting a magnetic force having a hysteretic characteristic.

2. A torque limiter according to claim 1 wherein said cylindrical member (11) is magnetized at a selected portion thereof, and said cylindrical member (10) comprises a hysterisis plate.

3. A torque limiter according to claim 1 wherein said cylindrical member (11) comprises a hysterisis plate, and said cylindrical member (1) is magnetized at a selected portion thereof.

* * * * *